Figure 1:
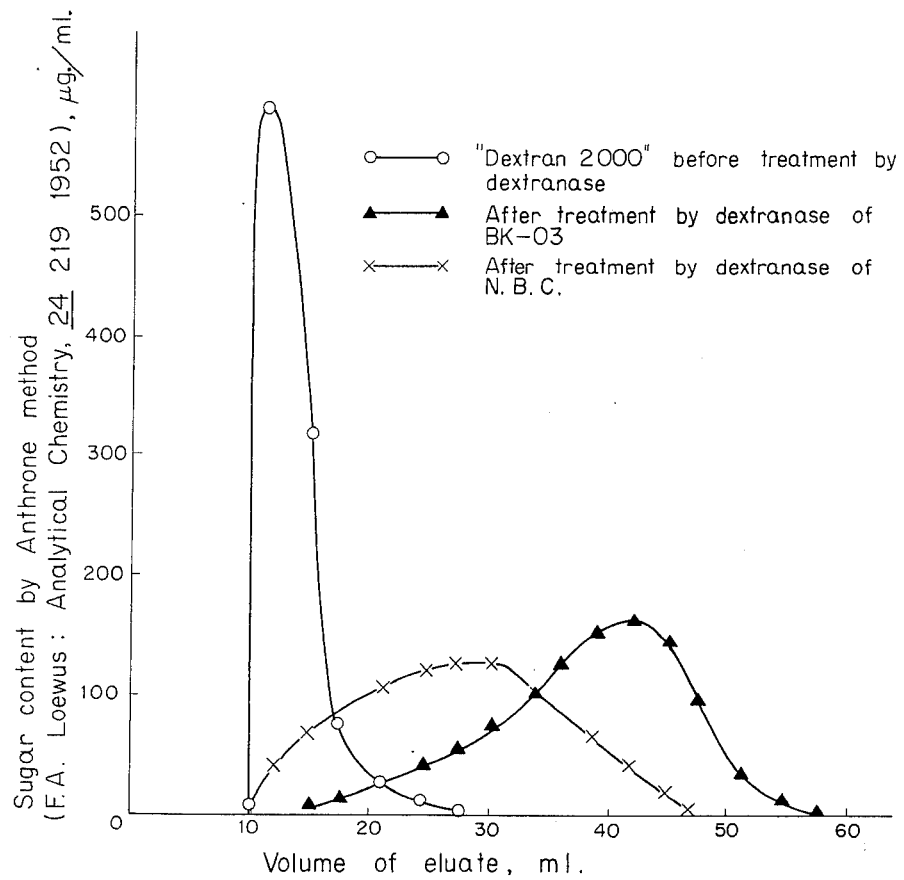

United States Patent [19]

Shimada et al.

[11] 3,912,594

[45] Oct. 14, 1975

[54] METHOD OF PRODUCING DEXTRANASE

[75] Inventors: Kazuo Shimada, Kanonji; Kenichi Kotera, Suita; Takaaki Uemura, Kanonji; Kunio Imamura, Kanonji; Nobuyoshi Ishikawa, Kanonji; Fumiko Hojho, Kanonji; Kiyoshi Ugawa, Kanonji, all of Japan

[73] Assignee: Research Foundation for Microbial Diseases of Osaka University, Japan

[22] Filed: Apr. 17, 1973

[21] Appl. No.: 351,886

[30] Foreign Application Priority Data
Apr. 17, 1972 Japan.............................. 47-39048

[52] U.S. Cl................................. 195/65; 195/66.R
[51] Int. Cl.²......................................... C12D 13/10
[58] Field of Search................ 195/65, 66 R; 424/50

[56] References Cited
UNITED STATES PATENTS

| | | | |
|---|---|---|---|
| 3,330,738 | 7/1967 | Napier | 195/66 R |
| 3,622,661 | 11/1971 | King et al. | 424/50 |
| 3,787,289 | 1/1974 | Davis et al. | 195/65 |

*Primary Examiner*—Lionel M. Shapiro
*Attorney, Agent, or Firm*—Armstrong, Nikaido & Wegner

[57] ABSTRACT

A method for the production of dextranase which comprises culturing a dextranase-biosynthesizing microorganism belonging to the genus Flavobacterium in a culture medium and recovering from said medium the dextranase which accumulates therein. According to the present invention, it has also been unexpectedly found that the incorporation of a dextran produced by a microorganism causing dental caries into the nutrient medium as an inducer is extremely effective for improving a hydrolyzing-activity of a dextranase produced by the method of this invention against dextran, as compared with that of the other type of dextran. The dextranase produced according to the present invention has an extremely superior hydrolyzing-activity to the dextran produced by the microorganisms causing dental caries as compared with those produced by the conventional processes.

5 Claims, 2 Drawing Figures

METHOD OF PRODUCING DEXTRANASE

This invention relates to a method for the production of dextranase.

More particularly, this invention is concerned with a method for the production of dextranase which comprises cultivating or culturing a dextranase-producing microorganism belonging to the genus Flavobacterium or a mutant thereof and recovering dextranase from the cultured broth.

Dextranase has been employed for the production of dextran which is widely utilized as blood substitute in medical field and further in recent years found highly useful as the enzyme for hydrolyzing the dextran formed by the action of microorganisms causing dental caries or tooth decay.

For this reason, it has been considered in the art that incorporation of dextranase into a tooth powder or other oral detergents provide a distinguished preventive and curative agent against tooth decay.

Hitherto, many microorganisms capable of producing dextranase have been proposed such as moulds, e.g., fungi belonging to the genera Penicillium, Aspergillus, Spicaria and Chaetomium, bacteria, e.g., those belonging to Lactobacillus and Cellvibrio and the like.

As a result of our extensive studies on a wide variety of microorganisms, including the above-recited ones, by the use of dextran and Sephadex (trade name of a dextran polymer bridged by epichlorohydrin produced and sold by Pharmacia Co., Ltd., Uppsala, Sweden) as a substrate, it has been unexpectedly found that a microorganism belonging to the genus Flavobacterium produces potent dextran-hydrolyzing enzyme and also that the enzyme so produced exerts extremely high hydrolyzing-activity against those dextrans formed by the action of various microorganisms causing tooth decay.

The dextranase-producing microorganism employed in the method of this invention has the following microbial characteristics:

| | | |
|---|---|---|
| (a) | Morphological characteristics | |
| 1. | Shape and size of cells $(1.0\sim3.0) \times (0.5\sim0.7)$ $\mu$ | : Rods |
| 2. | Polymorphism of cells | : Observed |
| 3. | Motility | : Non-motile |
| 4. | Spores | : Not formed |
| 5. | Gram staining | : Negative |
| 6. | Acid-fastness | : None |
| (b) | Cultural characteristics on various media | |
| 1. | Nutrient agar plate colonies are circular, hemispherical or flat, dewdrop like, smooth and opaque; glossy and viscous yellow type non-diffusing pigments. | : Good growth; |
| 2. | Nutrient agar slant | : Good growth |
| 3. | Nutrient broth | : Good growth |
| 4. | Bouillon-gelatin stab the surface of the culture along with stabbed line, no liquefaction | : Growth from |
| 5. | Litmus milk: Growth with slight acidification | |
| 6. | Potato: Good growth, yellow colonies | |
| (c) | Physiological characteristics | |
| 1. | Ranges of growth conditions: pH 5.5~8.5, Temperature 5~31°C. | |
| 2. | Behavior to oxygen: Facultative anaerobic | |
| 3. | Reduction of nitrates: Nitrites are produced from nitrates. | |
| 4. | Methyl red test | : Negative |
| 5. | Voges-Proskauer test | : Negative |
| 6. | Indole | : Negative |
| 7. | Formation of hydrogen sulfide | : Negative |
| 8. | Hydrolysis of starch | : Positive |
| 9. | Utilization of citrate | : Negative |
| 10. | Production of pigment | : Positive(Non-diffusing) |
| 11. | Urease | : Negative |
| 12. | Oxidase | : Positive |
| 13. | Catalase | : Positive |
| 14. | Acid production from carbon sources | |
| | (1) L-Arabinose | : Positive |
| | (2) D-Xylose | : Positive |
| | (3) D-Glucose | : Positive |
| | (4) D-Mannose | : Positive |
| | (5) D-Fructose | : Positive |
| | (6) D-Galactose | : Positive |
| | (7) Maltose | : Positive |
| | (8) Saccharose | : Positive |
| | (9) Lactose | : Negative |
| | (10) Trehalose | : Negative |
| | (11) D-Sorbitol | : Negative |
| | (12) D-Mannitol | : Negative |
| | (13) Inositol | : Negative |
| | (14) Glycerol | : Negative |
| | (15) Starch | : Positive |
| (d) | Other characteristics | |
| 1. | Resistance to sodium chloride | : 0~2.5 w/v% |
| 2. | Oxidation of gluconic acid | : Negative |
| 3. | Hydrolysis of Arginine | : Negative |

As a result of inspections based upon the abovementioned microbial characteristics by referring to "Manual for the Identification of Medical Bacteria," S. T. Cowan et al., Cambridge Univ. Press. 1965 and "Bergey's Manual of Determinative Bacteriology," Breed et al., 7th ed., the microorganism utilized in this invention has been determined to belong to the genus Flavobacterium in view of gram-negative rods, nonmotility, aerobic growth, catalase-positive, oxidasepositive, formation of yellow, non-diffusing pigment and acid production from various sugars.

Briefly speaking, this invention has been completed upon the above-mentioned findings and contemplates to involve a method for the production of dextranase which comprises cultivating a dextranase-biosynthesizing microorganism belonging to the genus Flavobacterium in a nutrient medium and recovering dextranase from the cultured broth.

It is, accordingly, a primary object of this invention to produce in a fermentation industry scale dextranase which shows a potent hydrolyzing activity on dextran, especially the one formed by those microorganisms causing dental caries.

Other objects and advantages of this invention will be apparent from the following detailed description of this invention.

Representative examples of the microorganisms which may be employed in this invention are those strains, Flavobacterium BK-01,03,04,05,06 (deposited with Technical Research Institute of Microbial Industry, Agency of Industrial Science & Technology, Japan, as accession numbers FERM-P Nos. 1194 and 1285 to 1288, respectively), but one may advantageously utilize in this invention other strains belonging to the genus Flavobacterium, as well as all mutants which may be produced from the described microorganisms by means of various conventional variation methods and are capable of producing dextranase, for instance, such mutants showing starch hydrolysis-negative or forming no yellow type colonies.

In carrying out the process of this invention, the dextranase-producing microorganism belonging to the genus Flavobacterium is cultivated in a natural or synthetic nutrient medium. The nutrient medium which may be employed in this invention may be of either of liquid or solid type, but it is preferable for production in a commercial scale to employ a liquid nutrient submerged culture. Nutrient sources of the medium which may be employed in this invention may be any of those usually utilized in the art for cultivation of a microorganism. For example, as assimilable carbon sources, such materials as dextran, glucose, saccharose, maltose, soluble starch and the like may be used. As the source of nitrogen in the nutrient medium may be, for example, peptone, meat extract, yeast extract, casein hydrolysate, ammonium salts such as ammonium phosphate, and the like. As the inorganic salts, such salts as those with phosphoric acid, magnesium, postassium and the like may be used. Cultivation temperature is within 5°~31°C., preferably 20°~30°C. The pH value of culture medium may be adjusted to 5.5~8.5, preferably 6.5~7.5. Cultivation period will vary depending on other cultivation conditions, but it is usually about 3~7 days in stationary culture or about 1 day in submerged culture. Cultured broth wherein the microorganism has abundantly grown under the above-mentioned condition is subjected to sterile centrifugation, a supernatant is separated therefrom and the resulting centrifuged deposits are extracted with water or a suitable buffer solution, for example M/15 phosphate buffer of pH 6.5, to recover crude dextranase. The crude dextranase so obtained may be employed by itself as a final product. Alternatively, it is desirable to recover a purified enzyme solution by additional employment of various methods such as concentration under reduced pressure, precipitation with salting out, organic solvent extraction and column fractionation, which may be employed alone or in combination.

The dextranase product which is produced according to the process of this invention was proved to mainly contain endodextranase, as can be seen from the following example, from the experimental facts that "Dextran 2000" (trade name of a dextran manufactured and sold by Pharmacia Co., Ltd., Uppsala, Sweden) be hydrolyzed into dextran of a molecular weight not more than 20,000~40,000 by means of column chromatography on "Bio-Gel" at 37°C. for 5 minutes and that rapid reduction in the viscosity of the so obtained dextran be observed by the action of the present enzyme. FIG. 1 is a graph showing the results from column chromatography on "Bio-Gel P-100" (trade name of a polyacryl amide gel manufactured and sold by Bio-Rad Laboratories 32nd and Griffin, Richmond, Calif., U.S.A.). In making this graph, The "Dextran 2000" of 1.0 w/v%, was admixed with the enzyme of this invention or the dextranase (control No. 9313) available from Nutritional Biochemicals Corp., cleveland, Ohio, U.S.A. (hereinafter referred to as "N.B.C.") in equal amounts, the mixture was permitted to stand at 37°C. for 5 minutes under a pH of 5.8 and then subjected to column chromatography on "Bio-Gel P-100 (column, 1.1 × 55cm; eluent, M/50 carabonate-bicarbonate buffer solution at pH 10.0; elution rate, 14 ml./hour). Moreover, the enzyme of this invention shows satisfactorily excellent effect in the dextran produced by microorganisms causing dental caries, especially those AHT microorganisms belonging to Group I (See, Jablon, J. M. et al.: J. Bacteriol., 92, 1950:1966).

Figure 2:
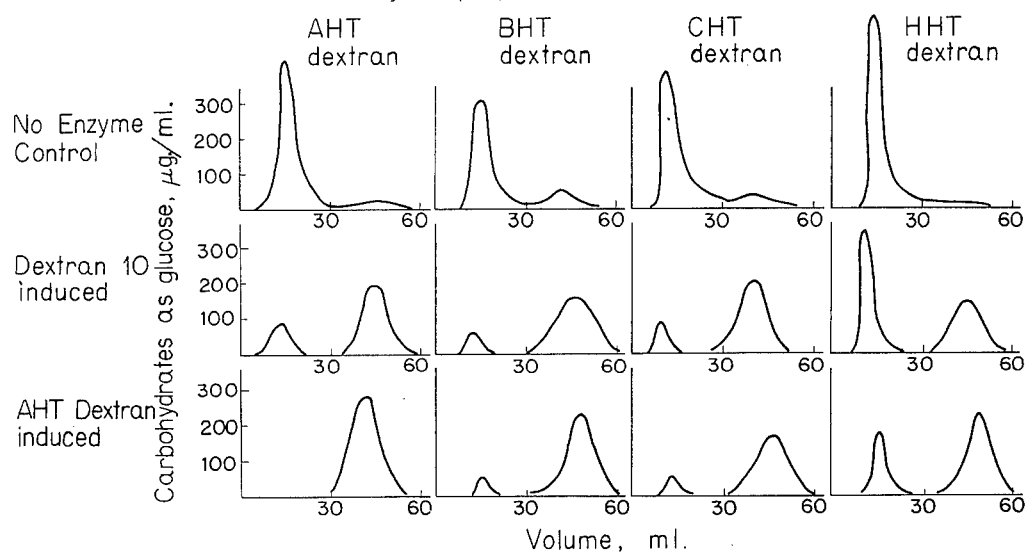

Furthermore, it is well known that a dextran may advantageously be, as an inducer, incorporated into the nutrient medium to obtain a high yield. According to the present invention, it has also been unexpectedly found that the incorporation of a dextran produced by a microorganism causing dental caries into the nutrient medium as an inducer is extremely effective for improving a hydrolyzing-activity of a dextranase produced by the method of this invention against dextran, as compared with that of the other type of dextran. For demonstrating this effect, we conducted a comparative test employing such column chromatography as employed in making FIG. 1. In this test, there are provided four kinds of streptococcal dextrans which are produced by incorporating the inducer "Dextran 10" or "AHT Dextran". The thus obtained crude enzyme solutions are subjected to the column chromatography or Gel-filtration. The results are shown in FIG. 2. In FIG. 2, the "AHT dextran", "BHT dextran", "CHT dextran" and "HHT dextran" mean dextrans produced by microorganism belonging to streptococcus, strain AHT, strain BHT, strain CHT and strain HHT, respectively. As is apparent from FIG. 2, the dextran produced by employing as the inducer AHT dextran has been fully hydrolyzed into a low molecular weight dextran.

The dextranase or its preparation which is produced according to the method of this invention has been found to be active at a pH value of 4.0~8.5, have its maximum activity at a pH value of about 6.5~7.5 and be stable at a temperature of about 55°C. or lower.

The dextranase produced by the method of their invention can be easily formulated into toothpaste or tooth powder, rubbing ointment or lotion, mouthwash, chewing gum, food, beverages and jet-stream teeth cleaner in such a manner to supplement them with 1,000~200,000 units of the dextranase per gram of the formulation (Belgium Pat. No. 718,645).

In order to demonstrate constitution and effect of this invention, example is given bellow.

EXAMPLE

6 Liters of liquid culture medium (adjusted to pH 7.0), which contained 1.5 w/v percent polypeptone, 0.1 w/v percent yeast extract, 0.2 w/v percent monopotassium phosphate, 0.2 w/v percent monoammonium phosphate, 0.1 w/v percent magnesium sulfate and 0.5 w/v percent Dextran 10 (trade name of a dextran manufactured and sold by the Pharmacia Co., Ltd.), was poured into a jar-fermenter of 10 liters and sterilized. Thereafter, the medium was inoculated with a strain of the microorganisms belonging to the genus Flavobacterium as indicated in Table 1. Cultivation was effected under aerated agitation at 30°C. for 20~24 hours.

The cultured broth so obtained was aseptically subjected to centrifugation to collect living mycelium. The cells thus collected were extracted with a M/15 phosphate buffer solution by adding 10 percent (based upon wet cells weight) of the cells to the solution and stirring the resulting mixture at 36°C. for 2~3 days. The extract thus obtained was centrifuged to separate a supernatant which was employed as crude enzyme solution in the subsequent procedures.

The activity of the enzyme as produced above was determined by the use of dextranase (control No. 9313) (manufactured and sold by N.B.C.) as a control in accordance with the following methods for determining activity.

Method 1.

"Dextran T70" (trade name of a dextran manufactured and sold by Pharmacia Co., Ltd., Uppsala, Sweden) and dextran produced by Streptococcus Strain AHT causing dental caries were employed as substrate. To 10 ml. of a 1 w/v percent solution of each dextran were added 4 ml. of a 0.1M acetate buffer solution and 1 ml. of the crude enzyme solution. The resulting mixture was permitted to stand at 37°C. for 30 minutes under a pH of 5.8 and then an increased amount of reducing sugar was determined by means of Somogyi method [M. Somogyi: J. Biol. Chem., 160,60 (1945)].

The results are summarized in the following Table 1 wherein a unit per ml. of the crude enzyme solution is given and one unit is defined to be the enzyme amount capable of liberating 1 m$\mu$M reducing sugar per minute.

Table 1.

| Strain | | Substrate "Dextran T70" | Substrate Dextran 1)produced by microorganism belonging to Streptococcus, strain AHT causing dental caries |
| --- | --- | --- | --- |
| Flavobacterium | BK-01 | 263 | 243 |
| " | BK-03 | 591 | 524 |
| " | BK-04 | 311 | 296 |
| " | BK-05 | 295 | 260 |
| " | BK-06 | 142 | 125 |
| Control 2) | | 368 | 231 |

1) Jablon, J.M., et al.: J. Bacteriol.,92, 1950, 1966
2) 1 w/v% solution of fungal dextranase(control No.9313) available from N.B.C. (See, C.F. Schachtele et al.: Infection and Immunity, Feb., 1972, P.263–266)

Method 2.

To 10 ml. of a 5 w/v% solution of Dextran 2000 were added 4 ml. of a 0.1M acetate buffer solution and 1 ml. of the crude enzyme solution. The mixture was permitted to stand at 37°C. under a pH of 5.8. Thereafter, the time required for decreasing the initial viscosity of dextran to a half, namely, time of half reduction of viscosity was measured by means of Ostwald's viscometer according to the teaching in Japanese Patent Application Publication No. 8067/1969.

The results are summarized in the following table 2.

Table 2.

| Strain | | Time of half reduction of viscosity, minutes |
| --- | --- | --- |
| Flavobacterium | BK-01 | 20 |
| " | BK-03 | 7 |
| " | BK-04 | 17 |
| " | BK-05 | 19 |
| " | BK-06 | 31 |
| Control | | 38 |

It can be seen from the above results that the enzyme produced by the process of this invention be endodextranase characterized by higher reductivity in viscosity than productivity of reducing sugar.

What is claimed is:

1. A method for the production of dextranase which comprises culturing a dextranase-biosynthesizing microorganism belong to the genus Flavobacterium and capable of producing a potent dextran hydrolyzing enzyme in a culture medium and recovering from said medium the dextranase which accumulates therein.

2. A method for the production of dextranase which comprises culturing a dextranase-biosynthesizing microorganism selected from the group consisting of Flavobacterium BK-01, BK-03, BK-04, BK-05 and BK-06 in a culture medium and recovering from said medium the dextranase which accumulates therein.

3. A method according to claim 2 wherein the culturing of said microorganism in the culture medium is effected by employing as an inducer a dextran produced by a microorganism causing dental caries.

4. A method according to claim 2 wherein the culturing is effected at a temperature of 5°–31°C.

5. A method according to claim 2 wherein the culturing is effected at a pH 5.5-8.5.

* * * * *